Feb. 18, 1947.  F. NAGLER  2,416,268
HYDRAULIC TURBINE SEAL
Filed Oct. 1, 1943

Inventor
Forrest Nagler
by Miles Henninger
Attorney

Patented Feb. 18, 1947

2,416,268

UNITED STATES PATENT OFFICE 2,416,268

HYDRAULIC TURBINE SEAL

Forrest Nagler, Wauwatosa, Wis., assignor to Allis-Chalmers Manufacturing Company, Milwaukee, Wis., a corporation of Delaware Application October 1, 1943, Serial No. 504,567

5 Claims. (Cl. 253—117)

1

This invention relates to improvements in seals for hydraulic turbines and particularly to means for maintaining adequate clearance between the flanges of the guide case cover, the discharge ring and the runner of reaction type turbines for reducing or limiting leakage therebetween.

Francis or propeller type hydraulic turbines are designed with the clearance or space between the speed rings and runner ranging from .01 to .1 inch depending on the particular installation and the care with which it has been manufactured and installed. Such clearance should be uniform around the entire periphery of the runner to minimize the leakage past the guide case cover, the discharge ring and the runner to prevent the entrance of trash into the clearance spaces and to prevent galling and seizing between the rotating and stationary parts. If the bearings supporting the shaft are in perfect condition, the clearance can be kept to the desired minimum but as soon as the bearings are worn or if damage occurs to the bearings or shaft, the runner rotates eccentrically within the stationary parts, producing excessive clearances about some portions of the periphery and coming into contact with the stationary parts at other portions of the runner periphery. Such unequal clearances may be the result also of inaccuracy in manufacture or improper installation. Regardless of the cause of unequal clearances, there is now no convenient and inexpensive structure known by which the clearance spacing can be adjusted after the turbine is in operation.

It is therefore an object of the present invention to provide means for adjusting the clearance spacing between the stationary parts and the runner of a reaction type hydraulic turbine after the installation thereof.

Another object of the invention is to provide a packing or seal ring applicable to the stationary parts of a hydraulic turbine of the reaction type to allow compensation for eccentricity of runner alignment within the stationary parts or to compensate for wear of the relatively moving adjacent parts.

Objects and advantages other than those above set forth will be apparent from the following description when read in connection with the accompanying drawing, in which:

Fig. 1 is a partial vertical sectional view of a hydraulic turbine of the Francis type showing the guide case cover and discharge ring flanges equipped with adjustable sealing rings of the present invention applied to the inner, lower and upper edges respectively of the guide case cover

2 and discharge ring for controlling the clearance between the stationary and the rotating parts of the turbine;

Figure 1:
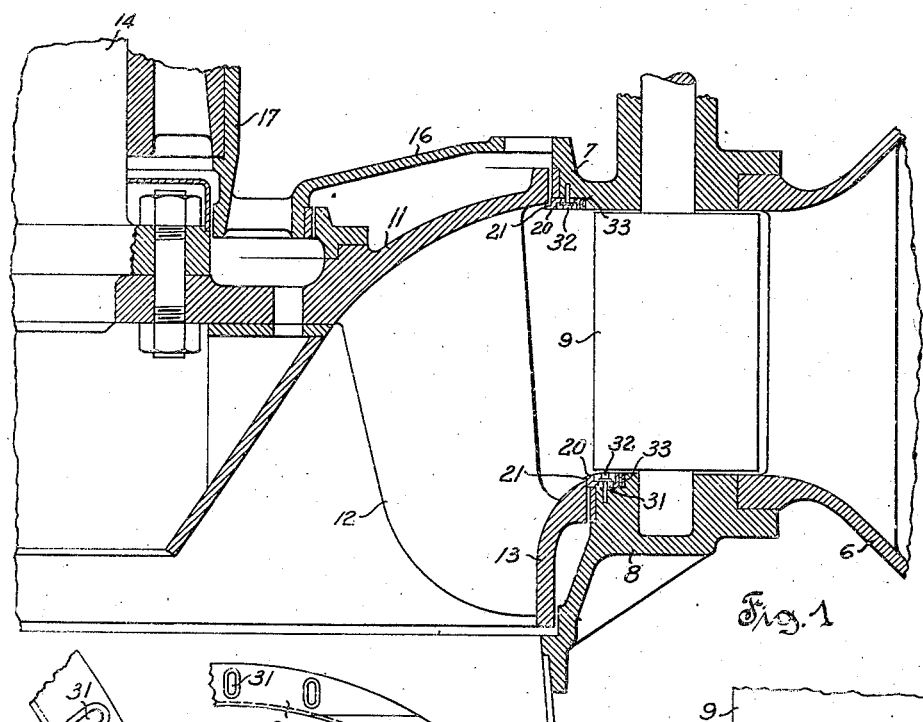

Referring to the drawing by characters of reference, the reference numeral 6 designates the spiral casing of a known type of reaction hydraulic turbine. The guide case cover 7 and the discharge ring 8, defining the walls of the guide case, are attached to the opening in the inner side of the spiral casing and speed ring formed thereby and have mounted therein gate vanes 9 for adjustment to various positions to control the flow of water from the casing. The runner which is shown as being of the Francis type includes a top cone 11, vanes 12 and a discharge band 13 and is mounted on the usual shaft (not shown) for rotation inside the guide cover 7 and discharge ring 8. The runner is further enclosed by a cover plate 16 joined to the guide case cover 7 and also joined with a housing 17 for a steady bearing for the runner shaft as is well known. Water under pressure flows through the spiral casing and between the speed ring flanges under control of the gates 9 and discharges into the passages formed by the vanes 12 of the runner which is rotated by the force of the water passing therethrough as is well-known.

Manufacture of hydraulic turbines by present day machine shop practice produces runner spacings from the adjacent stationary parts of distances varying from .01 to as much as .1 inch measured on a radius of the runner. And runner clearances of the order of .06 inch are currently used by some hydraulic turbine operators to allow for inaccuracy in manfacture. Such clearances allow the leakage of water therethrough even under the best conditions and collect foreign material which accelerates the wearing and enlargement of the clearance spacing. Maintenance of the desired clearances of as low as .01 inch requires the use of sealing rings which are adjustable as required by a particular turbine. The present application discloses sealing rings generally indicated at 20 and mounted in seats formed in the lower edge of the guide case cover 7 and in the upper edge of the discharge ring 8 and extending beyond such cover and rings toward the runner to closely adjacent the edge of the runner cone 11 and the runner discharge band 13, respectively.

Figures 2, 3, 4:
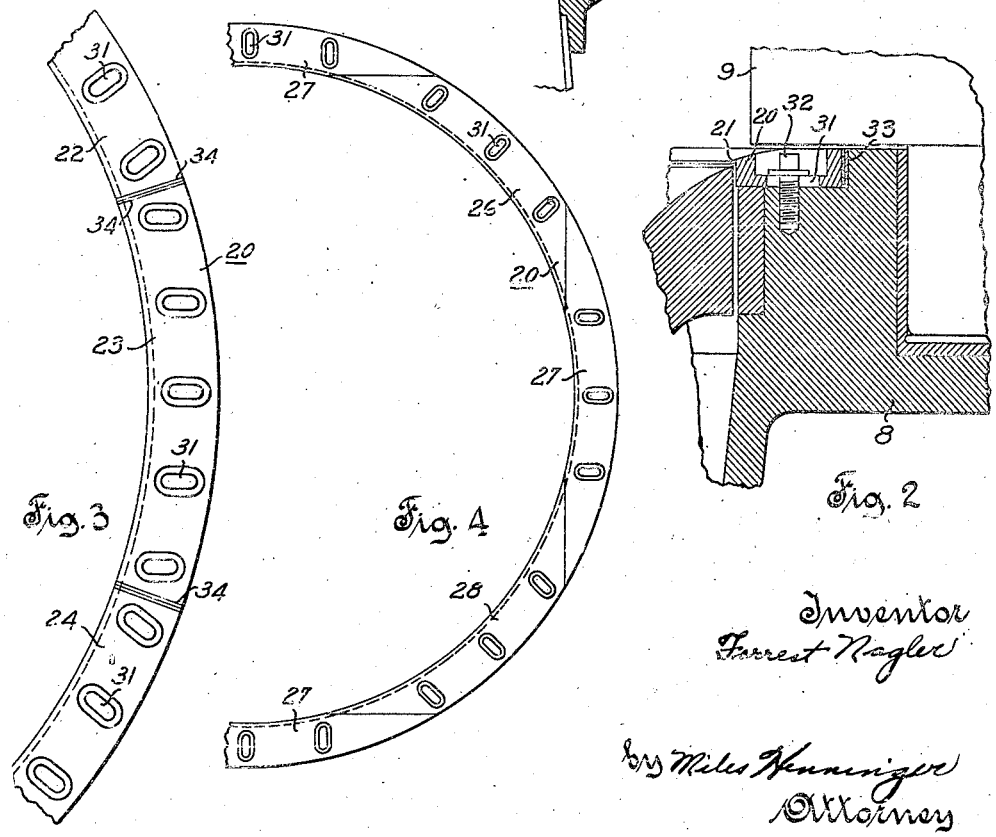
Fig. 2 is an enlarged fragmentary view of the discharge ring shown in Fig. 1 and illustrating the structure of the present invention in detail.
Fig. 3 is a partial top view of a sealing ring to illustrate the division of the sealing ring into sectors.
Fig. 4 is a partial top view to illustrate the division of the sealing ring into segments.

The seal rings may be formed with a lip 21 extending over the edge of the runner cone and discharge band and are divided into a plurality of sectors as shown at 22, 23 and 24 in Fig. 3 or as segments 26, 27 and 28 of Fig. 4. Each sector or segment is formed with a plurality of elongated or enlarged holes 31 therethrough to provide for passage of studs 32 screw threaded into the guide case cover and the discharge ring to hold the sealing ring portions firmly on their seats. As shown in Fig. 3 the sectors are cut on radii of the turbine and may have shims 33 between the back wall of the seats and the back vertical surface of the sectors and may have shims 34 placed between the adjacent ends of the sectors, all of such shims serving the purpose of aiding the studs 32 in retaining the sectors in the position to which they have been adjusted and of facilitating adjustment by addition of shims 33 and removal of shims 34. When the sectors 22, 23 and 24 are adjusted inwardly to diminish the clearance between the runner and the stationary parts the ends of the sectors approach each other and some of the shims 34 must be removed. As shown in Fig. 4 the sealing rings 20 may be cut on chord of arcs to form segments 26, 27 and 28 having overlapping ends. When the segments 26, 27 and 28 are adjusted inwardly the adjacent ends of the segments slide over each other and no shims need be used.

It will be seen that the divided sealing rings 20 whether made as sectors or as segments, may be adjusted either to increase or decrease the operating clearance of the turbine runner thus providing means compensating for any eccentricity of the runner or any wear between the stationary parts and the runner parts rotating adjacent thereto. Such adjustment may take place without dismantling the turbine and in increments over a period of years as required by corrosion or erosion. The minimum clearance can thus be maintained which reduces the possibility of entry of foreign material into the clearance spaces without incurring the danger of great damage to the turbine due to contact between the turbine runner and the stationary parts of the turbine resulting from eccentricity of the runner or vertical movement thereof. Any foreign material of appreciable size and even silt are passed right over the clearance space into the runner by the overhanging lip on the seal ring. The structure also presents the further advantage that the flow passages are simplified and the needs for close clearance, offsets, etc. are reduced thereby eliminating any efforts to check and maintain such clearances etc. during the life of the machine.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a hydraulic turbine including a spiral casing discharging between the walls of a guide case into a runner having an outer peripheral margin adjacent to and leaving running clearance space within an inner peripheral margin of a wall of said guide case; adjustable means for limiting leakage through said clearance space, said means comprising ring means including a member having a margin cooperable with said outer peripheral margin; a seat on said wall facing the inside of said guide case and providing a surface, collateral to the general plane of the discharge to said runner, on which said member is bodily slidably adjustable toward and away from said outer peripheral margin; and means for holding said member in adjusted position.

2. In a hydraulic turbine including a spiral casing discharging between the walls of a guide case into a runner having an outer peripheral margin adjacent to and leaving running clearance space within an inner peripheral margin of a wall of said guide case, a ring seated on said wall of said guide case, and means for adjusting said ring toward said runner in the direction of discharge thereto to limit leakage through said clearance space; said ring having a lip overhanging said clearance space, said lip being formed to extend over said outer peripheral margin.

3. In a hydraulic turbine including a spiral casing discharging between the walls of a guide case into a runner having an outer peripheral margin adjacent to and leaving running clearance space within an inner peripheral margin of a wall of said guide case; adjustable means for limiting leakage through said clearance space, said means comprising ring means including a plurality of arcuate members defining a ring and each having a margin cooperable with said outer peripheral margin; a seat on said wall facing the inside of said guide case and providing a surface, collateral to the general plane of the discharge to said runner, on which said members are bodily slidably adjustable toward and away from said outer peripheral margin; each of said arcuate members having a plurality of oblong holes therethrough, the longitudinal axes of said holes being at right angles to the chord of the arc defined by the respective arcuate member; and means, including studs disposed through said holes, constructed and arranged to hold said members in adjusted position.

4. In a hydraulic turbine including a spiral casing discharging between the walls of a guide case into a runner having an outer peripheral margin adjacent to and leaving running clearance space within an inner peripheral margin of a wall of said guide case; adjustable means for limiting leakage through said clearance space, said means comprising ring means including a plurality of sector shaped members defining a ring and each having a margin cooperable with said outer peripheral margin; a seat on said wall facing the inside of said guide case and providing a surface, collateral to the general plane of the discharge to said runner, on which said members are bodily slidably adjustable toward and away from said outer peripheral margin; and means for holding said members in adjusted position.

5. In a hydraulic turbine including a spiral casing discharging between the walls of a guide case into a runner having an outer peripheral margin adjacent to and leaving running clearance space within an inner peripheral margin of a wall of said guide case; adjustable means for limiting leakage through said clearance space, said means comprising ring means including a plurality of segment shaped members defining a ring and each having a margin cooperable with said outer peripheral margin; a seat on said wall facing the inside of said guide case and providing a surface, collateral to the general plane of the discharge to said runner, on which said members are bodily slidably adjustable toward and away from said outer peripheral margin; and means for holding said members in adjusted position.

FORREST NAGLER.

REFERENCES CITED

The following references are of record in the file of this patent:

UNITED STATES PATENTS

| Number | Name | Date |
|---|---|---|
| 1,516,822 | McCormack | Nov. 25, 1924 |
| 1,823,702 | Ring | Sept. 15, 1931 |
| 2,268,287 | Kermode | Dec. 30, 1941 |
| 1,716,870 | Sturgess et al. | June 11, 1929 |
| 1,682,339 | Hutchinson | Aug. 28, 1928 |